(12) United States Patent
Lee (10) Patent No.: US 7,754,164 B2
(45) Date of Patent: Jul. 13, 2010

(54) REFORMER AND FUEL CELL SYSTEM HAVING THE SAME

(75) Inventor: Dong-Hun Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1494 days.

(21) Appl. No.: 11/092,538

(22) Filed: Mar. 28, 2005

(65) Prior Publication Data

US 2005/0210748 A1  Sep. 29, 2005

(30) Foreign Application Priority Data

Mar. 29, 2004  (KR) .................. 10-2004-0021173

(51) Int. Cl.
*B01J 8/02* (2006.01)
*B32B 3/12* (2006.01)

(52) U.S. Cl. .................. 422/211; 422/171; 422/177; 252/62; 48/127.9; 48/61

(58) Field of Classification Search .............. 422/198, 422/191, 211, 171, 177; 48/127.9
See application file for complete search history.

(56) References Cited

U.S. PATENT DOCUMENTS

| | | | | |
|---|---|---|---|---|
| 3,687,223 A | * | 8/1972 | Streck | 181/292 |
| 4,931,340 A | * | 6/1990 | Baba et al. | 428/73 |
| 5,998,053 A | | 12/1999 | Diethelm | |
| 6,485,805 B1 | * | 11/2002 | Smith et al. | 428/36.5 |
| 2002/0168308 A1 | * | 11/2002 | Loffler et al. | 422/211 |

| | | |
|---|---|---|
| 2005/0191534 A1 | 9/2005 | Kim et al. |

FOREIGN PATENT DOCUMENTS

| | | |
|---|---|---|
| CN | 1173744 | 2/1998 |
| JP | 57-70600 U | 4/1982 |
| JP | 57-198210 U | 12/1982 |
| JP | 58-138845 | 8/1983 |
| JP | 62-138306 | 6/1987 |
| JP | 2-48401 | 2/1990 |
| JP | 4-119957 U | 10/1992 |
| JP | 5-200922 | 8/1993 |

(Continued)

OTHER PUBLICATIONS

Patent Abstracts of Japan, Publication No. 02-048401; Date of Publication: Feb. 19, 1990; in the name of Akio Furukawa.

(Continued)

*Primary Examiner*—Alexa D. Neckel
*Assistant Examiner*—Kaity V. Handal
(74) *Attorney, Agent, or Firm*—Christie, Parker & Hale, LLP (57) ABSTRACT

A reformer for a fuel cell system includes a reforming portion for converting fuel containing hydrogen into hydrogen-rich gas; and an adiabatic portion entirely covering the reforming portion, the adiabatic portion being composed of first and second adiabatic layers arranged opposing each other with at least one spacer interposed between the first and second adiabatic layers. As such, the fuel cell system has an effect of enhancing the adiabatic performance of a thermal reaction for producing reforming gas and distributing thermal residence stress uniformly on the surface of the reformer.

24 Claims, 7 Drawing Sheets

FOREIGN PATENT DOCUMENTS

| | | | |
|---|---|---|---|
| JP | 05-200922 | * | 8/1993 |
| JP | 407331850 A | * | 12/1995 |
| JP | 2001-261304 | | 9/2001 |
| JP | 2002-3203 | | 1/2002 |
| JP | 2002-160903 | | 6/2002 |
| JP | 2003-2602 | | 1/2003 |
| JP | 02003236953 A | * | 8/2003 |
| JP | 2003-327405 | | 11/2003 |
| KR | 10-2005-0087255 | | 8/2005 |

OTHER PUBLICATIONS

Patent Abstracts of Japan, Publication No. 05-200922; Date of Publication: Aug. 10, 1993; in the name of Hitoshi Hoshino et al.

Patent Abstracts of Japan, Publication No. 2002-003203; Date of Publication: Jan. 9, 2002; in the name of Nobutoshi Konagai et al.

Patent Abstracts of Japan, Publication No. 2002-160903; Date of Publication: Jun. 4, 2002; in the name of Kokichi Doi.

Patent Abstracts of Japan, Publication No. 2003-002602; Date of Publication: Jan. 8, 2003; in the name of Etsuro Hirai et al.

Patent Abstracts of Japan, Publication No. 62-138306, dated Jun. 22, 1987, in the name of Shigeki Yonezawa et al.

Patent Abstracts of Japan, Publication No. 2001-261304, dated Sep. 26, 2001, in the name of Yuichi Nagao et al.

Patent Abstracts of Japan, Publication No. 2003-327405, dated Nov. 11, 2003, in the name of Minoru Mizusawa et al.

* cited by examiner

REFORMER AND FUEL CELL SYSTEM HAVING THE SAME

CROSS REFERENCE TO RELATED APPLICATION

This application claims the benefit and priority to Korean Patent Application No. 10-2004-0021173, filed on Mar. 29, 2004 in the Korean Intellectual Property Office, the entire content of which is incorporated herein by reference.

FIELD OF THE INVENTION

The present invention relates to a fuel cell system, and more particularly, to a thermally insulated structure of a reformer used in a fuel cell system.

BACKGROUND OF THE INVENTION

A fuel cell is a system for producing electric power. In a fuel cell, chemical reaction energy between oxygen and hydrogen contained in hydrocarbon-group materials such as methanol, ethanol, and natural gas is directly converted into electric energy.

Depending on the type of electrolyte used in the fuel cell, the fuel cell is classified into different types, including: phosphate fuel cell, molten carbonate fuel cell, solid oxide fuel cell, and polymer electrolyte or alkali fuel cell. Although each of these different types of fuel cells operate using the same principles, they differ in the type of fuel, catalyst, and electrolyte used, as well as in drive temperature.

A polymer electrolyte membrane fuel cell (PEMFC) has been developed recently. As compared to other fuel cells, the PEMFC has excellent output characteristics, a low operating temperature, and fast starting and response characteristics. The PEMFC may be used in vehicles, in the home and in buildings, and for the power source in electronic devices. The PEMFC, therefore, has a wide range of applications.

The basic components of the PEMFC are a stack, reformer, fuel tank, and fuel pump. The stack forms the main body of the fuel cell. The fuel pump supplies fuel in the fuel tank to the reformer. The reformer reforms the fuel to create hydrogen gas, and supplies the hydrogen gas to the stack. Accordingly, the PEMFC sends the fuel in the fuel tank to the reformer by operation of the fuel pump. The fuel is reformed in the reformer to generate hydrogen gas, and the hydrogen gas is chemically reacted with oxygen in the stack to thereby generate electric energy.

In the fuel cell system described above, the reformer is a device that reforms liquid fuel by a chemical catalytic reaction to generate hydrogen gas. The reformer also reduces a concentration of harmful materials such as carbon monoxide that deteriorate the fuel cell to cut down its service life. The reformer includes a reforming portion for generating hydrogen gas and a removing portion to remove the carbon monoxide contained with the hydrogen gas. The reforming portion generates hydrogen-rich gas from liquid fuel by the catalytic reaction of a steam reform, partial oxidation, and/or natural reaction. To reduce the concentration of carbon monoxide contained in the hydrogen gas, the removing portion uses a catalytic reaction such as a water gas conversion method, a selective oxidation method, and/or a method of refining hydrogen using a separating layer.

In the fuel cell system described above, the reforming portion is provided with an exothermic reaction portion which introduces a catalytic oxidation reaction of the fuel and air to generate thermal combustion, and an endothermic reaction portion which introduces a catalytic reforming reaction with the thermal combustion of the exothermic reaction portion to generate the hydrogen-rich gas. The endothermic reaction portion uses a predetermined thermal reaction from the exothermic reaction portion so that it promotes a catalytic reforming reaction of the fuel mixture mixed with liquid fuel and water to convert it into the hydrogen-rich gas. Thus, such a reformer requires an adiabatic portion for protecting the thermal energy generated in the reforming portion from leakage in order to increase a product reaction efficiency of the hydrogen gas.

However, in the conventional fuel cell system, the adiabatic portion is constructed as a singular layer contacting the surface of the reforming portion. Accordingly, there is a problem in that a high heat transfer quantity is discharged from the surface of the reforming portion because the heat transfer path passing through the adiabatic portion is short. Further, in the conventional fuel cell system, the reformer is repeatedly operated such that a heat residence stress occurs on the surface of the reforming portion and concentrates locally thereon. Therefore, there is another problem in that the joining performance of the adiabatic portion and the reforming portion become degraded.

SUMMARY OF THE INVENTION

One aspect of the present invention provides a reformer and a fuel cell system using the same having an adiabatic structure that thermally insulates a leakage of heat of a reaction to help produce reforming gas.

One aspect of the present invention provides a reformer and a fuel cell system using the same having an adiabatic structure that is capable of uniformly diffusing heat residence stress that was distributed locally on portions joined with each other.

In one embodiment of the present invention, a reformer for a fuel cell includes a reforming portion for converting fuel contained with hydrogen gas into hydrogen-rich gas; and an adiabatic portion substantially covering the reforming portion, the adiabatic portion having first and second adiabatic layers. The first and second adiabatic layers are arranged opposing each other, and at least one spacer is interposed between the first and second adiabatic layers.

The spacer may be a porous block having a cavity formed in the porous block for exhausting to a vacuum. The spacer may comprise a plurality of spacers and each of the spacers is a cavity-type pillar. The pillar has a cavity for exhausting to a vacuum. The spacer may be a cavity-type hexagonal pillar, and the pillar may have a vacuum therein.

Each of the spacers may be in close contact with each other to form a honeycomb structure, or arranged to form a predetermined pattern having a space therebetween.

Also, a barrier portion for at least one of the spacers may be of a porous- or solid-type. The solid-type spacer may be a pillar with a circular, square, oval, or hexagonal cross-section, or the pillar may have a hexagonal cross-section.

Each of the solid-type pillars may be arranged to form a predetermined pattern having a space therebetween, and the pattern may be constructed to be a honeycomb structure which has a vacuum therein. That is, the plurality of solid-type pillars may be arranged into at least two groups, and the vacuum exists in a space formed between the at least two groups of the solid-type pillars. The spacers may also be porous pillars.

At least one of the first and second adiabatic layers of the adiabatic portion is substantially covering the reforming portion.

The adiabatic portion may be made from ceramic, stainless steel, and/or aluminum materials. Also, the adiabatic portion may have a third adiabatic layer disposed on at least one of the first and second adiabatic layers. The third adiabatic layer may be made from a glass fiber material.

In another embodiment of the present invention, a reforming reaction portion includes a first reaction portion for producing thermal energy by a catalytic oxidation reaction of the fuel and air, and a second reaction portion for absorbing the thermal energy produced from the first reaction portion to generate a hydrogen-rich gas through the catalytic reforming reaction of the vaporized fuel mixture. The reforming reaction portion may be aligned with at least one carbon monoxide reducing portion.

A fuel cell system employing a reformer in accordance with an embodiment of the present invention includes a reformer for generating the hydrogen-rich gas; a stack for making the hydrogen-rich gas and air react to generate electricity energy; a fuel supply portion for supplying the fuel for the reformer; and an air supply portion for supplying the reformer and the stack. The reformer includes a reforming portion for converting the fuel containing the hydrogen gas into the hydrogen-rich gas; and an adiabatic portion substantially covering the reforming portion. The adiabatic portion has first and second adiabatic layers arranged opposing each other and has at least one spacer interposed between the first and second adiabatic layers.

The fuel cell system may be a Polymer Electrolyte Membrane Fuel Cell (PEMFC) system.

In the fuel cell system employing the reformer in accordance with the embodiment of the present invention, the spacers may be porous blocks wherein cavities formed in the porous blocks are exhausted under vacuum, and each of the spacers are cavity-type pillars. Preferably, the pillars have cavities exhausted under vacuum, and more preferably, the spacers are cavity-types of hexagonal pillars, where the pillars have vacuum therein.

DETAILED DESCRIPTION

Figure 1:
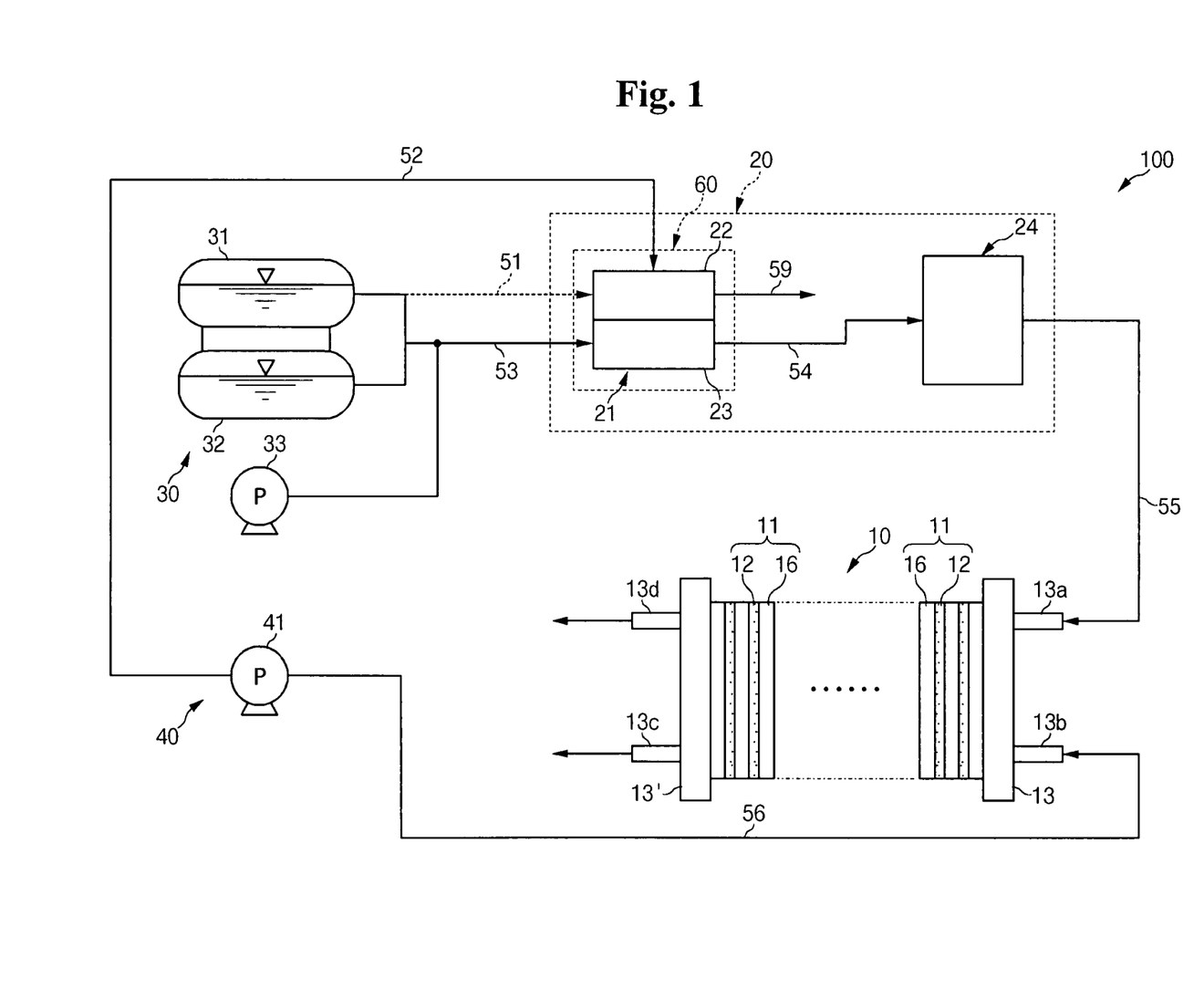
FIG. 1 is a schematic view of a fuel cell system according to an exemplary embodiment of the present invention.

Referring now to FIG. 1, in the exemplary embodiments of the present invention, a fuel cell system 100 employs a polymer electrode membrane fuel cell (PEMFC) method in which hydrogen gas is generated through a reformer 20, and the hydrogen gas is supplied to a stack 10 to thereby generate electrical energy by an electrochemical reaction between oxygen and hydrogen.

In particular, the fuel cell system 100 includes the reformer 20 for reforming fuel containing hydrogen gas to generate a hydrogen-rich gas, the stack 10 for converting chemical reaction energy of hydrogen gas and oxygen contained in air into electrical energy to thereby generate electricity, a fuel supply assembly 30 for supplying fuel to the reformer 20, and an oxygen supply assembly 40 for supplying air to the stack 10 and the reformer 20.

In a context of the present embodiment, a fuel for generating electricity can be referred to as a fuel containing hydrogen such as methanol, ethanol, and/or natural gas. In addition, a fuel can be in a liquid form, perhaps also mixed with water.

Furthermore, in the fuel cell system 100, oxygen used to react with hydrogen contained in the fuel may be a pure oxygen gas stored in a separate storage container, or simply the oxygen contained in the air. In the following embodiments, oxygen contained in the air is used.

The fuel supply assembly 30 includes a first tank 31 for storing liquid fuel, a second tank 32 for storing water, and a fuel pump 33 connected to the first tank 31 and the second tank 32. The oxygen supply assembly 40 includes an air pump 41 for taking in air.

Figure 2:
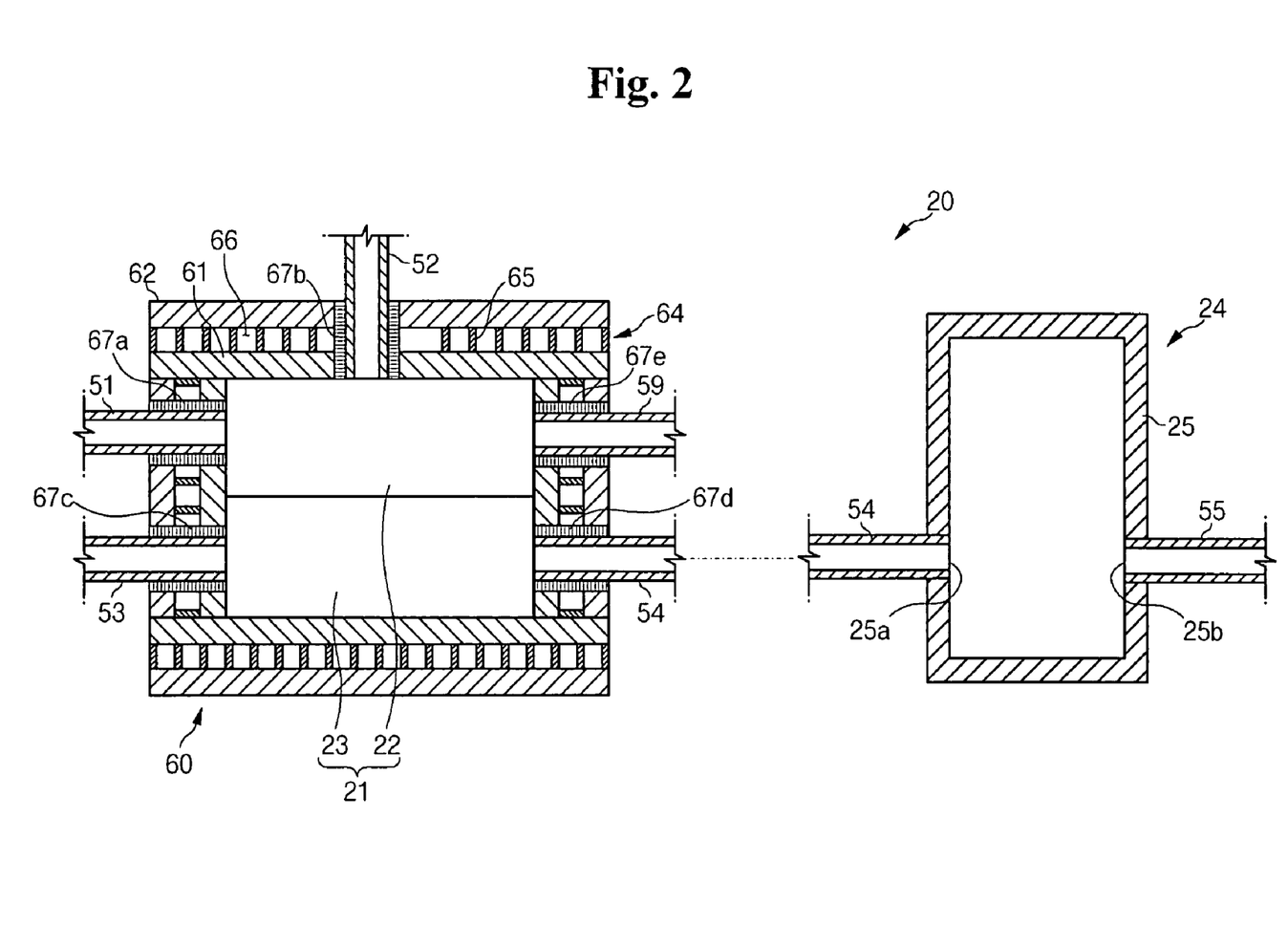
FIG. 2 is a cross section view of a reformer of FIG. 1.

FIG. 2 is a cross section view of a reformer of FIG. 1.

With reference to FIG. 1 and FIG. 2, in the fuel cell system 100 described above, the reformer 20 includes the reforming reaction portion 21 for generating hydrogen-rich gas from liquid fuel. The reforming reaction portion 21 has (or is coupled to or surrounded by) an adiabatic portion 60 for protecting thermal energy generated therefrom from radiating outwardly on the outer surface thereof.

The reforming reaction portion 21 includes a first reaction portion 22 producing the heat of reaction with a predetermined temperature by combusting the fuel mixture, and a second reaction portion 23 for absorbing the heat of reaction produced from the first reaction portion 22 to generate the hydrogen-rich gas from the fuel mixture. The first reaction portion 22 is an exothermic reaction portion that can generate a heat source required to produce the reforming gas, and it introduces a catalytic oxidation reaction of the fuel mixture.

The first reaction portion 22 can be a plate-type structure with a flow channel (not shown) to enable the fluid flow of the fuel mixture and air. The flow channels have an oxidation catalyst layer (not shown) thereon to promote the catalytic oxidation reaction of the fuel mixture. Also, the first reaction portion 22 may be connected with the first tank 31 of the fuel supply portion 30 through a first supply line 51 and to the air supply portion 40 through a second supply line 52, respectively. In addition, the first reaction portion 22 may be connected with a discharge line 59 to enable combustion gas combusted by the catalytic oxidation reaction, residual non-reacted fuel mixture, and residual air to exhaust out of the reformer 20.

The second reaction portion 23 functions to absorb the thermal energy produced from the first reaction portion 22 to vaporize the fuel mixture. In addition, the second reaction portion 23 functions to generate the hydrogen-rich gas from the vaporized fuel mixture through a steam reformer (SR) catalytic reaction.

The second reaction portion 23 can be a plate type structure with a flow channel (not shown) to enable the fluid flow of the fuel mixture and has a stacked structure sequentially stacked on one side of the first reaction portion 22. The flow channels have a catalyst layer (not shown) thereon to promote the catalytic reforming reaction of the fuel mixture. Here, the second reaction portion 23 may be connected with the first and second tanks 31 and 32 of the fuel supply portion 30.

Embodiments of the present invention, however, are not limited to the plate type structure(s) described above, and may have cylindrical structure(s) or vessel(s). That is, the first reaction portion 22 may have an oxidation catalyst layer at an inner part of a cylindrical reaction vessel, while the second reaction portion 23 may have a catalyst layer at the outer part of the cylindrical reaction vessel. Also, the first reaction portion 22 is aligned with the second reaction portion 23, and the first reaction portion 22 may have the second reaction portion 23 disposed on either the outer surface or inner surface thereof.

In the embodiment of FIGS. 1 and 2, the reformer 20 may be provided with at least one carbon monoxide reduction portion 24 disposed between the stack 10 and the reforming reaction portion 21. The carbon monoxide reduction portion 24 has a first reaction vessel for primary reducing of carbon monoxide contained in the hydrogen gas through a steam reformer (SR) catalytic reaction, and a second reaction vessel (not shown) for secondary reducing the concentration of the carbon monoxide contained in the hydrogen gas. The second reaction vessel can reduce the concentration of the carbon monoxide contained in the hydrogen gas through a preferential CO oxidation (PROX) catalytic reaction. The first and second reaction vessels may be connected with each other through a predetermined flow line.

In more detail, the carbon monoxide reduction portion 24 may be constructed such that it includes a cylindrical reaction vessel 25 connected with the reforming reaction portion 21 and a steam reformer (SR) catalytic layer and/or a preferential CO oxidation (PROX) catalytic layer (not shown). The reaction vessel 25 is provided with an inlet 25a for inflowing the reforming gas discharged from the reforming reaction portion 21 and outlet 25b for supplying the reforming gas with a reduced concentration of the carbon monoxide to the stack 10. The inlet 25a of the reaction vessel 25 may be connected with the second reaction portion of the reforming reaction portion 21 through a fourth line 54. The outlet 25b of the reaction vessel 25 may be connected with the stack 10 through a fifth line 55.

Figure 3:
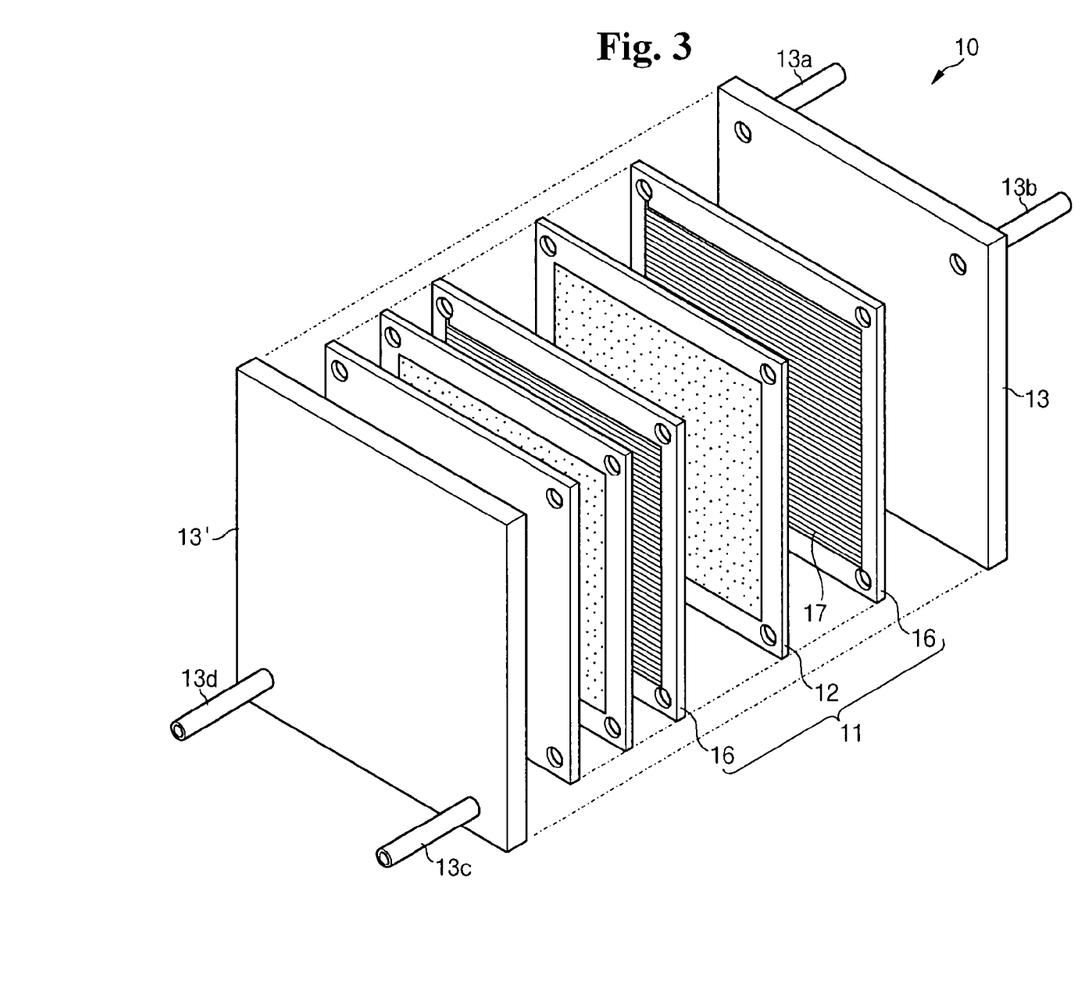
FIG. 3 is an exploded perspective view of a stack of FIG. 1.

With reference to FIGS. 1 and 3, the stack 10 includes at least one electricity generator 11 for generating electrical energy through an oxidation/reduction reaction of hydrogen-rich gas reformed by the reformer 20 with oxygen contained in the air. In more detail, each of the electricity generators 11 forms a minimum unit cell for generating electricity by interposing a membrane electrode assembly (MEA) 12 between two separators 16. A plurality of such unit cells are combined to form the stack 10 of the exemplary embodiment having a stacked configuration. Pressing plates 13, 13' are mounted opposite to outermost layers of the plurality of electricity generators 11. However, in the present invention, the separators 16 positioned in the outermost opposing layers may be used in place of the pressing plates 13, 13', in which case the pressing plates 13, 13' are not included in the configuration. When the pressing plates 13, 13' are used, they may have a function in addition to that of pressing the plurality of electricity generators 11 together. That is, as explained in the following, the pressing plates 13, 13' may act such that the separators 16 are made to have a particular function.

An anode electrode and a cathode electrode are mounted to opposite surfaces of each of the MEAs 12, and an electrolyte layer is positioned between the anode electrode and cathode electrode. The anode electrode effects an oxidation reaction of hydrogen gas, and converted electrons are attracted outwardly so that current is generated by the flow of electrons, which moves hydrogen ions to the cathode electrode through the electrolyte layer. The cathode electrode effects a conversion reaction of the hydrogen ions, electrons, and oxygen to realize the conversion into water. Further, the electrolyte layer moves the hydrogen ions generated in the anode electrode to the cathode electrode.

Each of the separators 16 acts as a path through which hydrogen gas and air needed for the oxidation/reduction reaction of the MEAs 12 are supplied to the anode electrode and the cathode electrode. Each of the separators 16 also function as a conductor for connecting the corresponding anode electrode and the cathode electrode in series. In more detail, each of the separators 16 provides a flow channel 17 to form a path on a surface closely contacting the anode electrode of the corresponding MEAs 12 for the supply of hydrogen gas to the anode electrode, and a path on a surface closely contacting the cathode electrode of the corresponding MEAs 12 for the supply of air to the cathode electrode.

The pressing plate (or input pressing plate) 13 includes a first inlet 13a for supplying hydrogen gas to the hydrogen path of the corresponding separator 16, a second inlet 13b for supplying air to the air path of the corresponding separator 16. The pressing plate (or output pressing plate) 13' includes a first outlet 13c for exhausting hydrogen gas remaining after reaction in the anode electrode of the corresponding MEAs 12, and a second outlet 13d for exhausting air remaining after reaction of water and hydrogen generated by a combination reaction of hydrogen and oxygen in the cathode electrode of the corresponding MEAs 12.

The adiabatic structure of the reformer 20 in accordance with exemplary embodiments of the present invention will now be described in more detail with reference to FIGS. 2, 4A, 4B, 4C, 4D, 4E, 4F, 5, 6, 7, and 8.

With reference to FIGS. 2, 4A, 4B, 4C, 4D, 4E, and 4F, the adiabatic portion 60 includes a first adiabatic layer 61 surrounding the reforming reaction portion 21, a second adiabatic layer 62 opposing (or spaced apart from) the first adiabatic layer 61, and at least one spacer 64 arranged in a space between these two layers 61, 62.

In particular, the first adiabatic layer 61 is arranged such that it is substantially surrounding the entire outer surface of the reforming reaction portion 21 to cover the first and second reaction portions 22, 23. The spacer 64 is arranged vertical to a plane of the first adiabatic layer 61 to enable the second adiabatic layer 62 to maintain a predetermined space with the first adiabatic layer 61.

Figure 4A:
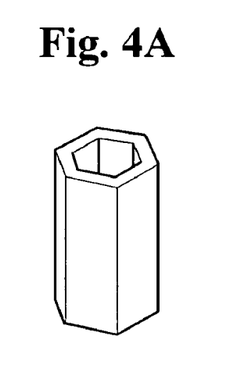
FIGS. 4A, 4B, 4C, 4D, 4E, and 4F are perspective views of embodiments of a spacer.
Figure 4B:
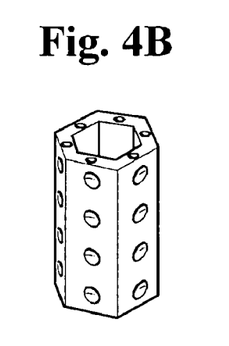
Figure 4C:
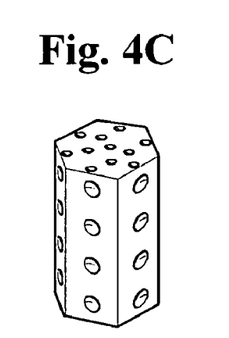
Figure 4D:
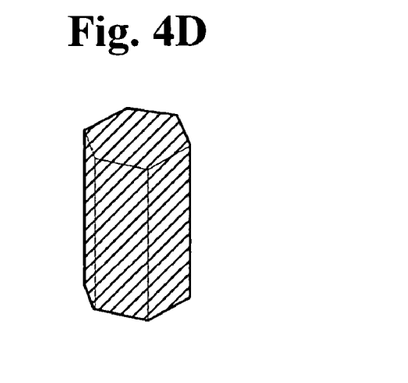
Figure 4E:
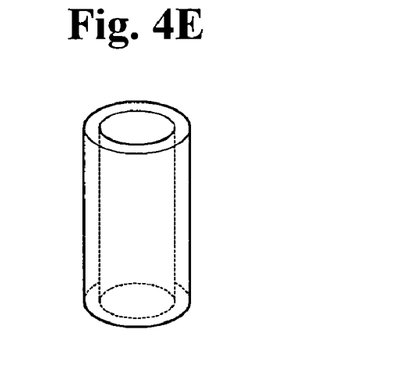
Figure 4F:
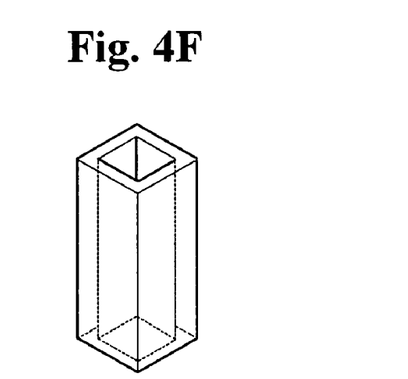

The spacer 64 may be a solid spherical type spacer, and/or pillar(s) with a circle, oval, triangle, square, and/or hexagonal cross-section as shown in FIG. 4A through FIG. 4F. In one embodiment, the spacer 64 may be made from a porous material, and/or the spacer 64 may have a cavity therein. In one embodiment, the spacer 64 may be a cavity-type spacer having a pillar with a hexagonal cross-section as shown in FIG. 4A.

The adiabatic portion 60 according to an exemplary embodiment is described in detail with reference to FIG. 5. Alternative embodiments of an adiabatic portion of the present invention that may be used in place of the adiabatic portion 60 in the fuel cell system 100 are described in detail with reference to FIG. 6 through FIG. 8. However, the present invention is not limited to the embodiments shown in FIG. 5 through FIG. 8.

Figure 5:
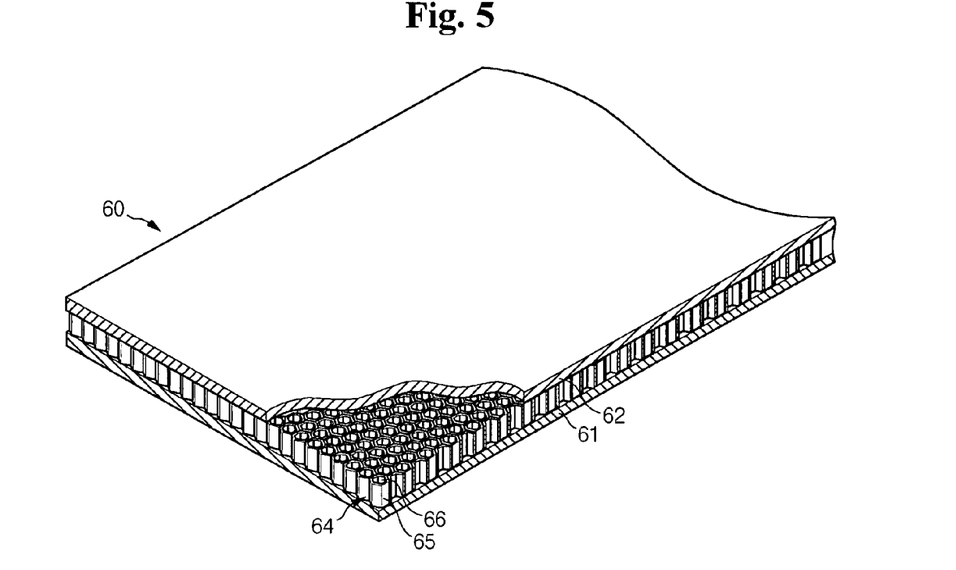
FIG. 5 is a partially cut perspective view of an adiabatic portion of FIG. 1.

With reference to FIG. 5, the adiabatic portion 60 has the spacers 64 arranged in a regular pattern. The spacers 64 are cavity-type spacers having pillars with a hexagonal cross-section and in contact with each other. Accordingly, the spacers 64 have closed cells 65 formed therein so that the closed cells 65 are arranged in a chain to compose a honeycomb structure. The upper and lower ends of the closed cells 65 are respectively closed by the first and second adiabatic layers 61, 62, and the inner space 66 of the spacers 64 can remain under a vacuum.

On the other hand, if the spacers 64 are solid-type spacers, the spacers 64 should be arranged so as to not continually contact each other, but to be separated. This is because there should be a space between the spacers 64 to be exhausted to a vacuum so as to increase the adiabatic performance. Thus, the solid-type spacers 64 should not be arranged as shown in FIG. 5.

Figure 6:
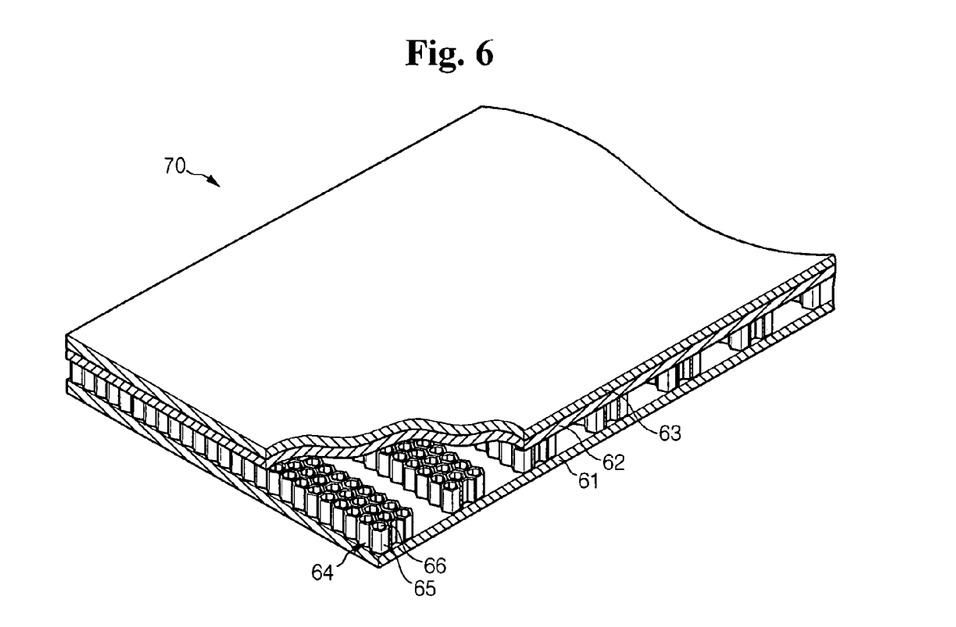
FIGS. 6, 7 and 8 are partially cut perspective views of alternative embodiments of an adiabatic portion.

With reference to FIG. 6, an adiabatic portion 70 has the spacers 64. Groups of the spacers 64 are separated from each other and/or arranged in a predetermined pattern. The upper and lower ends of the closed cells 65 are respectively closed with the first and second adiabatic layers 61, 62, and the inner space 66 of the spacers 64 and the space among the groups of the spacers 64 arranged in the predetermined pattern can remain under a vacuum.

In FIG. 6, the spacers 64 may be made from porous materials. On the other hand, if the spacers 64 are solid-type spacers, the spacers 64 can serve as the barrier walls of the cells 65. Accordingly, the space among the groups of the spacers 64 and/or inner space 66 of the spacers 64 can remain under a vacuum. In addition, a third adiabatic layer 63 may be provided to the adiabatic portion 70 to further minimize a thermal leakage.

Particularly and referring also to FIG. 5, if the spacers 64 are arranged into a honeycomb structure, the area in which the first and second adiabatic layers 61, 62 contact the cells 65 is minimized. Further, the inner space 66 of each of the spacers 64 can remain under a vacuum so that the vacuum among the inner space 66 can enable the heat transfer quantity between the first and second adiabatic layer 61, 62 to be minimal. Finally, since the spacers 64 have the above described structure of FIGS. 5 and 6, a uniform pressure can be applied to the first and second adiabatic layers 61, 62 and an external force applied to the first and second adiabatic layers 61, 62 can be dispersed evenly.

In the embodiments of FIGS. 5 and 6, the adiabatic portion 60, 70 insulates the heat produced from the reforming reaction portion 21 primarily by means of the first adiabatic layer 61 and secondarily by means of the space among the groups of the spacers 64, the inner spaces 66 of the spacers 64, and/or the second adiabatic layer 62. Consequently, the heat transfer quantity radiated externally through the second adiabatic layer 62 is minimized. That is, since the adiabatic portion 60, 70 has spacers 64 with the honeycomb structure, cells 65, vacuum space among the groups of the spacers 64, and/or vacuum inner space 66 between the first and second adiabatic layers 61, 62, the heat transfer path can be further extended. Accordingly, the reforming reaction portion 21 can effectively protect the heat of reaction from out-flowing, thereby enhancing the total thermal efficiency and the reaction efficiency of the reformer 20.

Further, in the present embodiment, the spacers 64 distribute pressure uniformly to the first adiabatic layer 61 so that the thermal residence stress may be distributed uniformly to the surface of the reforming reaction portion even though the reformer 20 is operated repeatedly. Accordingly, the invention may solve the problem of deteriorated bonding of the adiabatic portion 60, 70 and the reforming reaction portion 21.

The adiabatic portion 60, 70 may include at least two layers 61, 62 for covering the entire external surface of the reforming portion 21. This is to say, the adiabatic portion 60 is constructed such that a plurality of layers 61, 62 as above explained may be arranged in response to the profile of the reforming reaction portion 21. For example, in the case that the reforming reaction portion 21 is a hexahedron, the layers 61, 62 may be formed into a hexagonal plate in order to cover the above structure. However, the invention is not limited to such a structure, and the layers 61, 62 may be varied in response to the profile of the reforming reaction portion 21. In the case that the adiabatic portion 60, 70 is made from a metal substance, each of the layers 61, 62 may be fastened to each other by means of welding a joint portion thereof. On the other hand, in the case that the adiabatic portion 60, 70 is made from a nonmetal substance, each of the layers 61, 62 may be fastened to each other by means of applying an adhesive to the joint portion thereof.

Figure 7:
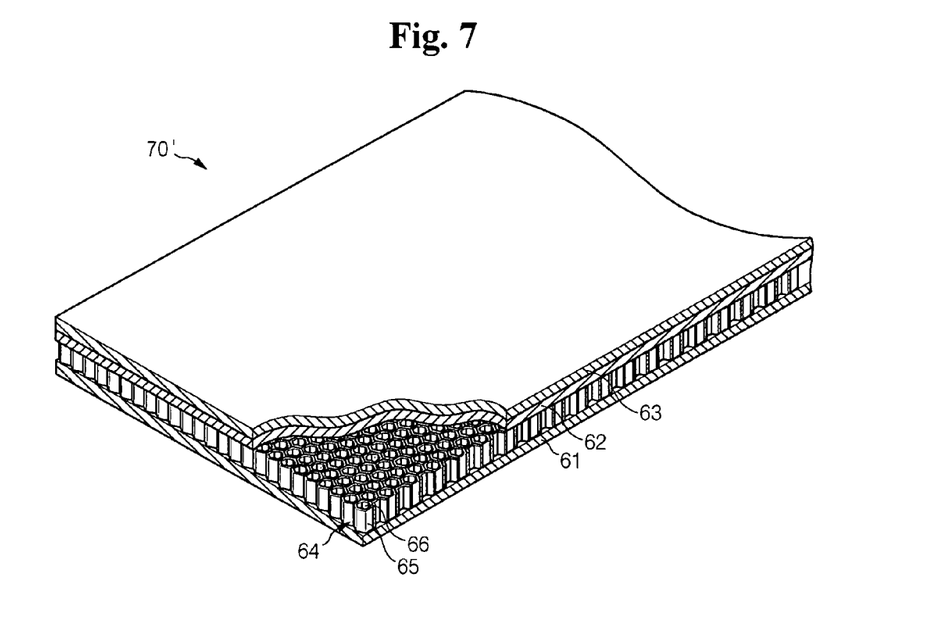

With reference to FIG. 7, the adiabatic portion 70' is constructed such that a third adiabatic layer is positioned on any one of the first and second layers 61, 62. As shown in FIG. 7, for example, the third adiabatic layer 63 is positioned on the second layer 62. The third adiabatic layer 63 further protects the thermal energy of the reforming reaction portion 21 from emitting through the second adiabatic layer 62, and therefore the third adiabatic layer 63 functions to reinforce the adiabatic performance of the adiabatic portion 70'. The third adiabatic layer 63 may be made from a glass fiber, and/or other suitable adiabatic substance(s). The present invention is not limited to such a structure of FIG. 7, as the third adiabatic layer 63 may be positioned on the first adiabatic layer 61 as well as on both of these two layers 61, 62.

Consequently, the adiabatic portion 70, 70' of FIGS. 6 and 7 insulates the heat produced from the reforming reaction portion 21 primarily by means of the first adiabatic layer 61; secondarily by means of the space among the groups of the spacers 64, the inner spaces 66 of the spacers 64, and/or the second adiabatic layer 62; and additionally by means of the third adiabatic layer 63. Therefore the adiabatic portion 70, 70' enables the thermal leakage to be minimal. That is, it is capable of insulating the thermal energy transferred from the first adiabatic layer 61 to the second adiabatic layer 62 by means of the third adiabatic layer 63 to further enhance the adiabatic performance.

Figure 8:
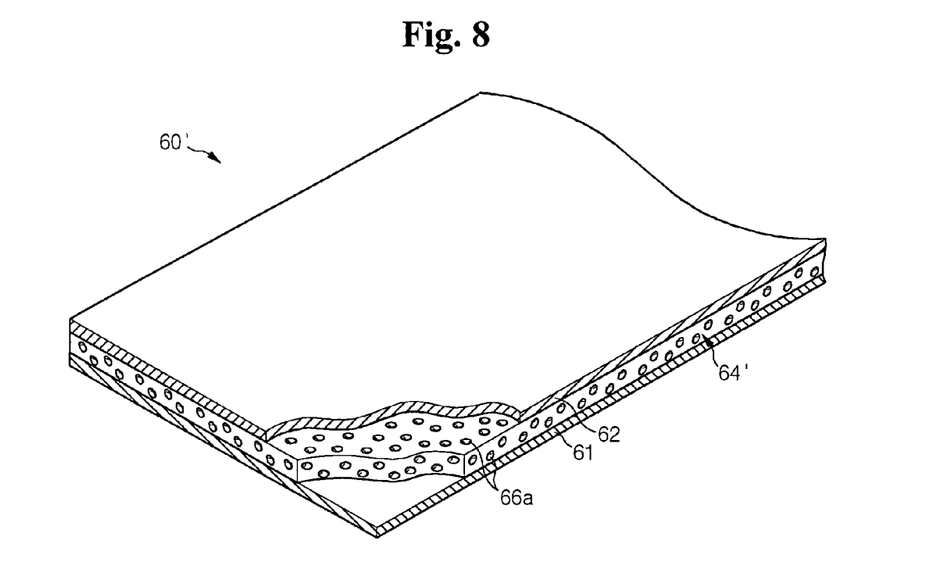

Referring now to FIG. 8, an adiabatic portion 60' includes a spacer 64' with a porous panel shape disposed between the first and second adiabatic layers 61, 62. The panel-shaped spacer 64' has an area depending on the plane of the two layers 61, 62. In addition, the panel-shaped spacer 64' has at least two semi-spheres 66a recessed on upper and lower surfaces thereof, which can be under a vacuum therein, to reduce a contact area of the spacer with the two layers 61, 62. The first and second adiabatic layers 61 and 62 substantially contact the spacer 64'.

Referring now back to FIGS. 1 and 2, the adiabatic portion 60 is shown with first and second communicating holes 67a, 67b. The first and second communicating holes 67a, 67b communicate with the first and second supply lines 51 and 52 so that the first tank 31 may connect with the first reaction portion 22 while the first reaction portion 22 communicates with the air pump 41. Also, the adiabatic portion 60 is provided with the third and fourth communicating holes 67c, 67d. The third and fourth communicating holes 67c, 67d communicate with the third and fourth supply lines 53, 54 so that the first and second tanks 31, 32 may connect with the second reaction portion 23 while the second reaction portion 23 connects with the carbon monoxide reduction portion 24. Finally, the adiabatic portion 60 is provided with the fifth communicating hole 67e to connect with the first reaction portion 22 through the discharge line 59.

The operation of the fuel cell system 100 according to the exemplary embodiment with the above structure will now be described.

First, the fuel pump 33 is operated such that the liquid fuel stored in the first tank 31 is supplied to the first reaction portion 22 through the first supply line 51. At the same time, the air pump 41 is operated such that air is supplied to the first reaction portion 22 through the second supply line 52.

The liquid fuel and the air effect a catalytic oxidation reaction in the first reaction portion 22 to generate the thermal reaction. Then, combustion gas, the non-reacted air, and fuel generated in the first reactor 22 are exhausted through the discharge line 59 out of the reformer 20.

Next, the fuel pump 33 is operated such that the liquid fuel stored in the first tank 31 and the water stored in the second tank 32 are supplied to the second reaction portion 23 through the third supply line 53. The second reaction portion 23 receives the heat generated in the first reaction portion 22 to be heated to a predetermined temperature. The second reaction portion 23 generates the reformed gas containing $CO_2$ and the hydrogen gas by effecting the degeneration reaction of the mixed fuel (liquid hydrogen and water) and the CO reforming reaction at the same time through an SR catalytic reaction. Then, since the second reaction portion 23 cannot convert CO into $CO_2$ completely, it produces the reforming gas containing a very small amount of the CO.

When the fuel cell system operates in such a manner, the adiabatic portions 60 (or 70, 60', 70') protect the thermal reaction of the reforming reaction portion 21 from emitting to the outside thereof.

Next, the reforming gas produced in the first reaction portion 22 is supplied to the reaction vessel 25 of the carbon monoxide reduction portion 24 through the fourth supply line 54. Then, the fuel pump 33 may be operated to supply the reforming gas for the reaction vessel 25. The reaction vessel 25 enables the concentration of the carbon monoxide contained with the reforming gas to be reduced through a Water-Gas Shift Reaction (WGS) catalytic reaction or a preferential CO oxidation (PROX) catalytic reaction.

Successively, the reforming gas reduced in concentration of monoxide is supplied to the first inlet 13a of the stack 10 through the fifth supply line 55. Then, the fuel pump 33 may be operated to supply the reforming gas for the first inlet 13a of the stack 10. At the same time, the air pump 41 is operated to supply the air for the second inlet 13b of the stack 10.

Therefore, the hydrogen gas is supplied to the anode electrodes of the MEAs 12 via the air paths of the separators 16. Further, the air is supplied to the cathode electrodes of the MEAs 12 via the air paths of the separators 16. Accordingly, the hydrogen gas is resolved into electrons and protons (hydrogen ions) by an oxidation reaction at the anode electrodes. Further, the protons move to the cathode electrodes through the electrolyte layers, and since the electrons are unable to pass through the electrolyte layers, they move to the adjacent cathode electrodes of the MEAs 12 through the separators 16. The flow of the electrons during this operation creates a current. Further, water and heat are additionally generated by the reduction reaction of the moved protons, electrons, and hydrogen.

In general and in view of the foregoing, a fuel cell system of the present invention has an effect of further enhancing an adiabatic performance to increase an overall thermal efficiency and reaction efficiency of a reformer of the system since the heat transfer quantity discharged from the reforming portion to the outside thereof is reduced.

In addition, the fuel cell system has an effect on enhancing the adiabatic performance, since the bonding performance is reinforced between the reformer and an adiabatic portion.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer for a fuel cell system, comprising:
   a reforming portion for converting fuel containing hydrogen into hydrogen-rich gas; and
   an adiabatic portion substantially covering the reforming portion,
   the adiabatic portion having first and second adiabatic layers;
   wherein the first and second adiabatic layers are arranged opposing each other; and
   wherein a plurality of spacers are between the first and second adiabatic layers,
   wherein the plurality of spacers are arranged into a plurality of spacer groups having a predetermined pattern with vacuum spaces separating the plurality of spacer groups from each other to reduce a transfer of heat between the first and second adiabatic layers.

2. The reformer for a fuel cell system of claim 1, wherein at least one of the plurality of spacers comprises a porous block having a cavity formed therein for exhausting to a vacuum.

3. The reformer for a fuel cell system of claim 1, wherein each of the plurality of spacers comprises a cavity-type pillar, the cavity-type pillar having a cavity for exhausting to a vacuum.

4. The reformer for a fuel cell system of claim 1, wherein at least one of the plurality of spacers comprises a cavity-type-hexagonal pillar and wherein the cavity-type-hexagonal pillar has a vacuum therein.

5. The reformer for a fuel cell system of claim 4, wherein each of the plurality of spacers in each of the plurality of spacer groups are in contact with each other to form a honeycomb structure.

6. The reformer for a fuel cell system of claim 1, wherein each of the plurality of spacers has a porous barrier wall.

7. The reformer for a fuel cell system of claim 1, wherein each of the plurality of spacers is a solid-type pillar.

8. The reformer for a fuel cell system of claim 1, wherein each of the plurality of spacers comprises a pillar having a circular, square, oval, or hexagonal cross-section.

9. The reformer for a fuel cell system of claim 8, wherein the pillar has a hexagonal cross-section.

10. The reformer for a fuel cell system of claim 7, wherein the solid-type pillars are arranged to form the predetermined pattern having the vacuum spaces therebetween.

11. The reformer for a fuel cell system of claim 7, wherein the plurality of spacers in each of the plurality of spacer groups are formed in a honeycomb pattern.

12. The reformer for a fuel cell system of claim 1, wherein each of the plurality of spacers comprises a porous pillar.

13. The reformer for a fuel cell system of claim 1, wherein at least one of the first and second adiabatic layers of the adiabatic portion substantially covers the reforming portion.

14. The reformer for a fuel cell system of claim 1, wherein the adiabatic portion is made from ceramic, stainless steel, and/or aluminum materials.

15. The reformer for a fuel cell system of claim 1, wherein the adiabatic portion has a third adiabatic layer disposed on at least one of the first and second adiabatic layers.

16. The reformer for a fuel cell system of claim 15, wherein the third adiabatic layer is made from a glass fiber material.

17. The reformer for a fuel cell system of claim 1, wherein the reforming portion comprises:
   a first reaction portion for producing thermal energy by a catalytic oxidation reaction of the fuel and air; and
   a second reaction portion for absorbing the thermal energy produced by the first reaction portion to generate a hydrogen-rich gas through a catalytic reforming reaction of a vaporized fuel mixture.

18. The reformer for a fuel cell system of claim 1, further comprising at least one carbon monoxide reducing portion, the reforming portion being aligned with the at least one carbon monoxide reducing portion.

19. A fuel cell system comprising:
a reformer for generating hydrogen-rich gas;
a stack for making the hydrogen-rich gas and air react to generate electricity energy;
a fuel supply portion for supplying fuel for the reformer; and
an air supply portion for supplying air to the reformer and the stack, the reformer including a reforming portion for converting the fuel containing the hydrogen into the hydrogen-rich gas, and an adiabatic portion substantially covering the reforming portion;
wherein the adiabatic portion comprises first and second adiabatic layers;
wherein the first and second adiabatic layers are arranged opposing each other; and
wherein a plurality of spacers are interposed between the first and second adiabatic layers, wherein the plurality of spacers are arranged into a plurality of spacer groups having a predetermined pattern with vacuum spaces separating the plurality of spacer groups from each other to reduce a transfer of heat between the first and second adiabatic layers.

20. The fuel cell system of claim 19, wherein the plurality of spacers comprises a plurality of porous blocks, wherein a plurality of cavities are formed in the plurality of porous blocks, and wherein the plurality of cavities are exhausted to a vacuum.

21. The fuel cell system of claim 19, wherein each of the plurality of spacers comprises a cavity-type pillar, and wherein the pillars have a cavity exhausted to a vacuum.

22. The fuel cell system of claim 19, wherein the plurality of spacers comprise a plurality of cavity-type-hexagonal pillars, and wherein the plurality of cavity-type-hexagonal pillars have a vacuum therein.

23. The fuel cell system of claim 19, wherein the fuel cell system is a Polymer Electrolyte Membrane Fuel Cell (PEMFC) system.

24. The reformer for a fuel cell system of claim 1, wherein each of the plurality of spacers is a cavity-type-hexagonal pillar having a vacuum therein.

* * * * *